Figure 1:

United States Patent [19]

Bonnefon et al.

[11] 4,005,054

[45] Jan. 25, 1977

[54] PRODUCTION OF POLYOLEFIN-REINFORCED RUBBER PRODUCTS

[75] Inventors: Alain Bonnefon, Espinay sur Seine; Jack Benard, Asnieres, both of France

[73] Assignee: Pneumatiques, Caoutchouc Manufacture et Plastiques Kleber-Colombes, France

[22] Filed: Feb. 8, 1973

[21] Appl. No.: 330,619

[52] U.S. Cl. .................... 260/42.56; 204/159.2; 260/4 R; 260/889; 264/147; 264/210 F; 264/288
[51] Int. Cl.² ...................... C08J 3/22; C08L 7/00; C08L 23/06
[58] Field of Search ............... 260/4, 42.56, 889; 264/288, 147, DIG. 47, 210 F

[56] References Cited

UNITED STATES PATENTS

| 2,927,904 | 3/1960 | Cooper | 260/889 |
| 3,294,868 | 12/1966 | Pritchard | 260/889 |
| 3,474,051 | 10/1969 | Chappelear et al. | 260/889 |

*Primary Examiner*—J. Ziegler
*Attorney, Agent, or Firm*—Craig & Antonelli

[57] ABSTRACT

A flexible, homogeneous rubbery product comprising a matrix of a rubber selected from the group consisting of natural and synthetic elastomer in which there is uniformly dispersed at least 5% by weight based on the weight of the elastomer of a crystalline polyolefin whose molecular weight is equal to or greater than 500,000. A substantial proportion of the polyolefin is in the condition or form of fine particles which are drawn out in the form of elongated fibrils having a diameter smaller than 5 microns. This product exhibits a very high resistance to elongation in at least one direction.

17 Claims, 2 Drawing Figures

Echelle :

10 μ = 20 mm

Echelle :

2 μ = 20 mm

PRODUCTION OF POLYOLEFIN-REINFORCED RUBBER PRODUCTS

This invention relates to unique polyolefin reinforced rubber products and to the process for producing such products.

It is well known in the art of manufacturing rubber articles to admix to the basic elastomer more or less reinforcing pulverulent materials for the purpose of obtaining the best physical and mechanical properties useful for the applications being envisaged. The reinforcing material which is most frequently used is certainly carbon black, but other materials such as zinc oxide, silica, and other less reinforcing, or inert, materials are also employed. There have also been proposed mixtures of elastomers, i.e. rubbery polymers, and plastomers, i.e. other thermoplastic polymers, in order to obtain products having properties immediate or between those of the elastic rubbers and plastic materials from the point of view of elasticity, hardness, impact strength, etc.

However, for numerous finished rubber articles it is desirable that the articles have a great pliability with respect to bending, but an elongation at stress that is as low as possible. This is ordinarily obtained by incorporating pliable or flexible non-extensible textile reinforcements in the rubber article. For example, fabrics, or cords of cotton, rayon, nylon, glass, metal, etc. may be used for this purpose. At the macroscopic range, these reinforced rubber articles display a clearly heterogeneous structure compared to the homogeneous structure of those rubber articles which have been reinforced solely with fine pulverulent materials.

The incorporation into the rubber of textile reinforcements imposes numerous attendant requirements in the course of the manufacture. For purposes of obtaining the union or bond between the rubber and the textile materials, these materials must generally be treated beforehand with adhesives or adhesive mixtures, or special bonding agents must be incorporated in the rubber. Also, in the course of the manufacture, the very high degree of non-extensibility of the textiles makes shaping of the blanks or rough pieces difficult even before vulcanization which normally would be allowed by the plasticity of the non-vulcanized rubbery mixture.

It has thus been envisaged to replace the textile reinforcements in the form of cloths or fabrics, or the plies of continuous textile cords by short discontinuous fibers which are pre-cut and incorporated into the elastomer or rubber matrix in order to produce or obtain relatively homogeneous mixtures which, in the crude state, are still quite deformable in all directions and which, after vulcanization, are not very, or hardly, extensible. However, this procedure is very limited inasmuch as the operation of mixing, or blending, and shaping the mixtures becomes very difficult with the customary machines as soon as the proportion of short fibers added to the rubber exceeds a small value. Moreover, the mechanical properties of the rubber products thus obtained, such as the flexibility or pliability, and heating by hysteresis, are often adversely affected. The practical applications of these mixtures of rubber and short fibers have therefore remained small.

It is therefore an object of the present invention to obtain pliable or flexible rubber products which are homogeneous at the macroscopic range or scale while nevertheless having a very high resistance to elongation, at least in one direction.

The rubbery products of this invention comprise a natural or synthetic elastomer, and a reinforcing material dispersed in the elastomer said material comprising at least about 5% by weight of a crystalline polyolefin having a very high molecular weight equal to or greater than 500,000, in the form of fine particles which, in a considerable proportion, are stretched out or drawn out in the form of elongated small fibers or fibrils having a sectional diameter smaller than about 5 microns. By way of example, these small fibers have, for the most part, a diameter in the order of one micron and a length on the order of from about 2 to about 20 millimeters. The fineness or thinness of these small fibers or fibrils and the dispersion thereof in the elastomer have the effect that the rubbery products in question maintain a homogeneous character analogous to that of the rubbery products containing only fine pulverulent material, such as carbon black. Nevertheless, these small polyolefin fibers or fibrils having a high molecular weight impart to the resultant rubbery products a very high resistance to elongation which greatly exceeds that of all conventional flexible and homogeneous rubbery products, and which may reach values comparable to that of rubber products reinforced with textile plies or cord plies. The term "very high resistance to elongation" must thus be understood to mean a resistance such that the dynamic modulus of the product (measured at the conditions hereinafter indicated) is greater than 1,000 kg/cm$^2$. This resistance may also be represented by a modulus of elasticity, and in this case it is greater than 20 kg/cm$^2$ for an elongated of only 1%.

Advantageously, the small polyolefin fibers or fibrils distributed in the rubber have a preferential orientation in a manner such that the products have different properties of elongation depending upon the directions of elongation or a modulus of elasticity which in the longitudinal direction, i.e. the direction of preferential orientation of the small fibers or fibrils, is higher than that in the transverse direction, for example 10 to 100 times higher.

The rubbery products may also contain one or several other reinforcing materials, notably carbon black, in a variable proportion by weight according to or depending upon the properties desired for each product. Carbon black may be useful particularly in the case of the anisotropic products (to which reference has been had) with a view toward increasing the resistance of the product in the transverse direction with respect to the direction of orientation of the small polyolefin fibers or fibrils; the latter assuring essentially the resistance of the product in the longitudinal direction of orientation of the small fibers or fibrils.

The present invention is equally directed to and concerned with a process for obtaining these products. This process comprises kneading a mixture of rubber and polyolefin particles having a very high molecular weight at a temperature close to and preferably higher than the melting point of the polyolefin so as to mix and to obtain a fibrillation in situ of the polyolefin particles; and then treating the kneaded mixture so as to maintain the particles in the form of small fibers or fibrils in the final elastic rubber product.

The polyolefin may be incorporated in the cold at the beginning of mixing operation, preferably in the form of a fine discrete powder, or in the hot in the course of the mixing operation, in the form of a fine powder (or the polyoefin may be previously somewhat melted or softened by heat). However, it is always necessary to knead the mixture of rubber and polyolefin particles at a temperature close to or higher than that of the melting point of the polyolefin in order to melt the polyolefin particles and in order to develop, in the course of this operation, shearing forces which produce a division of the largest particles as well as the drawing out or extruding of a considerable proportion of these particles that will then form elongated small fibers or fibrils which may have a diameter in the order of one micron and a length in the order of from 2 to 20 millimeters. The temperature of the mixture of rubber and polyolefin must be greater than the melting point by 10° to 25° C. when the polyolefin is polyethylene and by 0° to 50° when the polyolefin is polypropylene. Thus for polyethylene the temperature of the kneading or mixing mixture is from about 148° C to about 163° C and for polypropylene the temperature is from about 170° C to about 230° C. It will be understood that the proportion of particles drawn into fibers or fibrils will vary, but in accordance with this invention at least about 50% of the particles added are subsequently in the form of fibers or fibrils. Also the dimensions of the polyolefin particles added initially to the rubber are between about 20 and 400 microns.

When the mixing or blending operation of the rubber and polyolefin is started in an internal mixer such as a Bambury mixer and continued on a mill, or when it is carried out entirely on a mill, there is obtained a preferential orientation of the polyolefin fibrils in that the polyolefin particles are more or less pushed or forced in the direction of the drawing or stretching out of the mixture between the cylinders. The same orientation occurs when the mixture, having been made with another type of mixing apparatus, is thereafter treated at a temperature close to or higher than the melting temperature of the polyolefin, with an apparatus that draws out the mixture, like a mill, a calender, or an extruder. The products obtained from these mixtures may have a high degree of anisotropy, i.e. a longitudinal modulus of elasticity much higher than the transverse modulus of elasticity with respect to the direction of orientation of the fibrils.

When the product has been mixed in a hot state, as indicated hereinabove, in order to obtain a fibrillation in situ of the polyolefin particles, it is essential to treat the product immediately so as to preserve the fibrillated state or condition of the polyolefin. As a matter of fact, it has been observed that, if no particular precaution is taken, the polyolefin fibrils of the mixture tend to contract as a result of the visco-elastic forces being induced, and to become transformed into particles which are not elongated, or hardly elongated at all. The rubbery products obtained with this mixture will then have resistances to elongation that are much smaller than those of the invention. This is true also when the mixture is subjected to a second mixing or blending operation at a temperature lower than that of the melting point of the polyolefin, this operation probably tending to break the polyolefin fibrils.

One procedure or expedient of treatment for maintaining the polyolefin particles in the state or condition of elongated fibrils in the product consists in cooling the mixture to a temperature of at least 20° C. lower than the melting temperature of the polyolefin, while still keeping it under tension so as to prevent the product from contracting. Generally, up to 120° C for polyethylene and 150° C for polypropylene; below these temperatures the tension is no longer necessary because the small fibrils of polyolefin are stabilized and no longer exert any appreciable contractive force. Mixtures cooled in this manner give products having much more elevated moduli of elasticity than the same mixtures having been cooled (or having been allowed to cool) freely, and it is believed according to the results obtained that a cooling under tension of the mixtures contributes significantly to polyolefin particles drawn out in fibrils which thereafter can no longer become elastically contracted in the midst of the or within the mixture. When the mixture has been worked on a mill, in an extruder, or in a calender, or in any other apparatus which produces the preferential orientation of the fibrils, the cooling under tension of the sheets or bands of the mixture produces products capable of having a very high modulus in the longitudinal direction and a very high ratio of anisotropy. It will be appreciated that the tension applied to the sheet or band of the mixture must not produce an undesirable elongation of the sheet or band.

The preceding treatment may be combined with, or completed by, a thermal treatment that has the effect of reinforcing the toughness or strength of the fibrils which is obtained by the drawing or stretching out of the polyolefin particles in the course of the mixing or blending. This complementary treatment consists in heating once more the mixture having been cooled under tension, and in maintaining this mixture for some time at a temperature close to the melting point of the polyolefin, (i.e. between about −20° and +10° C from the melting point) while preventing the mixture from becoming contracted. In order to avoid the reheating operation, it is also possible to keep or hold the mixture issuing or discharging from the mixer at this elevated temperature while still preventing the mixture from becoming contracted. This thermal treatment which corresponds to a kind of annealing of the polyolefin fibrils within the mixture, is followed by a cooling of the mixture under tension. When the mixture contains a vulcanizable elastomer, this thermal treatment may be carried out simultaneously with the vulcanization of the elastomer. When the mixture contains a non-vulcanizable elastomer, this thermal treatment may be carried out at the time of a simple molding or shaping operation or a pressing operation and may be followed by a cooling of the mixture below the melting point of the polyolefin.

The rubbers which may be used for obtaining the rubbery products according to the present invention comprise for the most part rubbers that are known per se, particularly cis-1, 4 polyisoprene (natural or synthetic rubber), cis-polybutadiene, the copolymers of styrene and butadiene, like those designated by the term "S.B.R.", the copolymers of butadiene and acrylonitrile, the copolymers of polyisobutylene and isoprene, like those known under the term "butyl rubber", the copolymers of ethylene and propylene, like those designated with the term "E.P.R.", and those combined with a third diene monomer, like those designated with the term "E.P.T.R.", or "E.P.D.M.", the polychloroprenes, such as those sold under the name of "Neoprene" and the like.

The present invention is equally applicable to the so-called thermoplastic rubbers which, in contrast to those mentioned hereinbefore, do not need to be vulcanized in order to assume the final plastic state or condition. These thermoplastic rubbers are copolymers formed of blocks with an orderly or arranged structure : one of these being thermoplastic, and the others being elastomeric, such as, for example, the sequential copolymers of butadiene and styrene commercially available and sold under the term "Cariflex".

The crystalline polyolefins suitable for the present invention are polymers of monoethylenic (alphene or olefin) hydrocarbons which have generally from 2 to 6 carbon atoms. The average molecular weight of these polymers, measured by viscosimetry is very high; that is to say, approximately equal to or higher than 500,000. This group of polymers comprises notably polyethylene and isotactic polypropylene.

In the case of vulcanizable mixtures, the fact that the rubber and the polyolefin have to be worked at a temperature close to the melting temperature of the polyolefin (138° C. for polyethylene and 167°–170° C. for polypropylene) may give rise to difficulties regarding the incorporation of the usual vulcanization agents. This incorporation may be made in the course of a supplementary mixing or blending operation carried out at a low temperature (which is to say, at a temperature lower than the vulcanizing temperature) in order to avoid scorching of the mixture. But, as has been indicated hereinabove, the vulcanizates obtained thereafter have moduli that are much lower, probably because this supplementary mixing operation at low temperature tends to break a certain proportion of the polyolefin fibrils.

According to the present invention, this drawback may be avoided by immersing the kneaded rubber-polyolefin mixture into a solution containing a vulcanization system in a manner such as to cause the vulcanizing agents to be diffused in the mixture without making it necessary to knead or mix it again.

This drawback may also be avoided by preparing two distinct batches of rubber-polyolefin mixtures and, in the course of blending or kneading these mixtures, incorporating in one of them sulfur and in the other an accelerating system exempt from free sulfur. These two batches are arranged in sheets (or leaves or foils), and the sheets of the mixture containing the sulfur are superimposed alternately with sheets of the mixture containing the accelerator so as to form a "sandwich", composite. When this sandwich-type composite is subsequently heated, the sulfur and the accelerator agent diffuse from one mixture to the other and react in order to vulcanize the entire composite.

It is further possible to vulcanize by irradiations by causing the product to pass into an electron generator, or also into a gamma ray generator.

It is equally possible to add, toward the end of the mixing or blending operation, a vulcanization system comprising a strong retarding agent, such as for example the product called P.V.I. and sold by the Monsanto Company, which allows for homogenizing the vulcanization system in the mixture in the course of the latter part of the mixing operation without risk of scorching.

Several examples for preparing the products according to the present invention will be described hereinafter by way of example and without being limitative. In all of these examples, the parts are expressed by weight per 100 parts by weight of elastomer.

EXAMPLE 1

Two identical batches or series are prepared of a rubbery mixture on the basis of a styrene-butadiene rubber, S.B.R., and of a polyethylene having a high molecular weight "GUR Hostalen" (polyethylene having an average molecular weight of 1,000,000 measured by viscosimetry, in the form of a fine powder having an average granulometry in the order of 100 microns with a size range between 20 and 400 microns, a melting point of 138° C., and a density of 0.945). The composition is as follows:

|  | Parts by Weight |
| --- | --- |
| S.B.R. | 100 |
| polyethylene | 30 |
| phenyl-beta-naphthylamine (anti-oxidant) | 1 |
| zinc oxide | 3.5 |
| stearic acid | 2 |

The mixing or blending operation is carried out on a mill and the polyethylene, in powder form, is incorporated at the beginning when the rubber has a temperature of about 60° to 80° C. which facilitates the dispersion. The mixture is then processed for 10 minutes approximately at a temperature of 156° C.

In the course of the blending of one of the batches, 4 parts of sulfur are added thereto about 3 minutes before the end of the operation. In the course of the blending or mixing of the other batch, 2 parts of zinc diethyldithiocarbamate accelerator are added thereto.

Each batch of the mixture is extracted from the mixer in the form of thin leaves or sheets which are cooled under tension so as to prevent their becoming longitudinally contracted, and thereafter alternate sheets of one and the other series of the mixture are vulcanized together and under pressure of 8 bars at 120° C. for 35 minutes.

The properties of the product obtained are as follows:

|  | Longitudinal Direction | Transverse Direction |
| --- | --- | --- |
| Modulus of elasticity at 1% elongation ($kg/cm^2$) | 185 |  |
| Modulus of elasticity at 100% Elongation ($kg/cm^2$) |  | 40 |
| Resistance to breaking ($kg/cm^2$) | 1.043 | 136 |
| Breaking elongation. | 5.5% | 360% |
| Dynamic modulus ($kg/cm^2$) | 11.525 (a) | 152 (b) |
| Loss angle | 3.9° | 6.2° | a. Tests by extension with a pre-tension of 3%, a frequency of 7.5 Hz and an amplitude of 0.5% of the dynamic deformation (the value indicated represents the inclination of the straight stress or traction line).

b. Tests by extension with a pre-tension of 15%, a frequency of 7.5 Hz and an amplitude of 5% of the dynamic deformation (the value indicated represents the inclination of the stress or traction curve drawn back to the origin).

These properties show notably an extremely elevated anisotropy ratio in the order of 100, i.e. a very high modulus in the longitudinal direction, a much less elevated modulus in the transverse direction. The product obtained is comparable in this respect to a cord layer or ply consisting of parallel textile cord embedded in a layer of ordinary vulcanized rubber.

The loss angle which is small indicates a weak hysteresis of the product.

EXAMPLE 2

Prepared are, as in Example 1, two identical batches or series of a rubbery mixture containing natural rubber, carbon black, and polyethylene having a high molecular weight:

|  | Parts by Weight |
|---|---|
| natural rubber | 100 |
| HAF black | 20 |
| polyethylene (GUR Hostalen) | 20 |
| Z n O | 5 |
| stearic acid | 3 |
| Santoflex 13 (antioxidant) | 2 |
| Dutrex oil | 3 |

The mixture is worked in the hot on a cylinder mixer at a temperature of 156° C. for about 15 minutes and, as in the preceding example, 4 parts of sulfur are added to one of the batches 3 minutes before the end of the operation. Added to the other batch were, moreover, 2 parts of zinc diethyldithiocarbamate accelerator.

After cooling under tension of the sheets issuing from the cylinder mixer, and after vulcanization under pressure of the sheets alternating in sandwich fashion between one batch and the other at 120° for 25 minutes, the product obtained has the following properties:

|  | Longitudinal Direction | Transverse Direction |
|---|---|---|
| Modulus of elasticity at 1% elongation (kg/cm²) |  |  |
| Modulus of elasticity at 100% elongation (kg/cm²) | 30 |  |
| Resistance to breaking (kg/cm²) | 420 | 205 |
| Breaking elongation | 10% | 490% |
| Dynamic modulus (kg/cm²) | 7.430 (a) | 75 (b) |
| Loss angle | 3.6° | 7.3° |

These properties are quite comparable to those of the product obtained according to Example 1.--using same tests (a) and (b)--

EXAMPLE 3

Prepared in a single batch or series is a very retarded rubbery mixture having the following composition:

|  | Parts by Weight |
|---|---|
| natural rubber | 100 |
| HAF black | 40 |
| polyethylene (GUR Hostalen) | 30 |
| stearic acid | 3 |
| ZnO | 5 |
| antioxidant Santoflex 13 | 2 |
| Dutrex oil | 3 |
| Santocure MOR | 0.75 |
| Retarding agent P.V.I. Monsanto | 1 |
| sulfur | 2 |

The mixture without the vulcanization system A is worked or processed for 6 minutes at 155° C. on a mill, thereafter the system A is added, and mixing is continued for another 4 minutes. The mixture is extracted in sheet form which is cooled under tension so as to avoid the longitudinal contraction thereof; then vulcanizing is carried out under pressure of 4 bars at 141° C. for 50 minutes.

The properties of the product obtained thereby are as follows:

|  | Longitudinal Direction | Transverse Direction |
|---|---|---|
| Modulus of elasticity at 2% elongation (kg/cm²) | 225 |  |
| Modulus of elasticity at 3% elongation (kg/cm²) | 335 |  |
| Modulus of elasticity at 100% elongation (kg/cm²) |  | 59 |
| Resistance to breaking (kg/cm²) | 580 | 219 |
| Breaking elongation | 5.5% | 340% |

EXAMPLE 4

Incorporated in a thermoplastic rubber (Cariflex TR 4122) (a sequential copolymer of butadiene and styrene) are 30 parts of the polyethylene, "GUR Hostalen", (as used in preceding examples) on a mill at a temperature of 105° C. The mixture is processed for 2.5 minutes at a temperature of 156° C. After cooling under tension of the sheets issuing from the mixer, the product obtained has the following properties:

|  | Longitudinal Direction | Transverse Direction |
|---|---|---|
| Modulus of elasticity at 1% elongation (kg/cm²) | 130 |  |
| Modulus of elasticity at 100% elongation (kg/cm²) |  | 50 |
| Resistance to breaking (kg/cm²) | 1.160 | 120 |
| Breaking elongation | 9.7% | 420% |

EXAMPLE 5

For the purpose of determining the influence of the thermal treatment on the mixtures containing a polyolefin fibrillated in situ, a mixture was prepared on the basis of natural rubber, carbon black, and polyethylene, analogous to that described in Example 3 but without the vulcanization ingredients. Samples of this mixture cooled under tension at the outlet of the mixer to prevent contraction were placed under pressure of 2 to 5 bars in a piston mold and reheated for 1 hour at different temperatures, then cooled again in the mold. The breaking resistance of the different samples having been reheated in this fashion was measured with respect, or as compared, to that of a non-reheated sample.

| Temperature of Reheating Under Pressure | | | Resistance to Breaking kg/cm² |
|---|---|---|---|
| non reheated sample | | | 500 |
| No. 1 | at | 122° C. | 498 |
| No. 2 | at | 130° C. | 530 |
| No. 3 | at | 140° C. | 585 |
| No. 4 | at | 146° C. | 560 |
| No. 5 | at | 150° C. | 183 |

It is evident from the foregoing that the thermal treatment consisting in heating the mixture to a temperature close to the melting point of the polyethylene (138° C.) allows for increasing the toughness of this mixture (samples 2, 3, 4). It may be assumed that this thermal treatment produces a stabilization of the polyethylene crystals within the fibrils obtained by drawing out the polyethylene particles in the course of the mixing or blending.

EXAMPLE 6

Samples of the mixture based on the thermoplastic rubber Cariflex obtained according to Example 4 are subjected to a thermal treatment of annealing by heating under pressure in a mold preventing their contraction, thereafter cooled under the same conditions as those described in Example 5. The moduli and the resistances to breaking of the samples which were heated for 1 hour were measured at different temperatures, and compared to those of a sample that was not reheated.

| Temperature of reheating under pressure | | | Modulus at 2.5% (kg/cm$^2$) | Resistance to Breaking (kg/cm$^2$) |
| --- | --- | --- | --- | --- |
| non reheated sample | | | 460 | 830 |
| No. 1 | at | 110° | 460 | 820 |
| No. 2 | at | 121° | 460 | 840 |
| No. 3 | at | 130° | 490 | 860 |
| No. 4 | at | 140° | 600 | 920 |
| No. 5 | at | 146° | 530 | 780 |
| No. 6 | at | 152° | 430 | 600 |
| No. 7 | at | 157° | 150 | 280 |

Here again, it is obvious that the samples 3, 4 and 5, treated at a temperature close to the melting point of polyethylene have improved stress properties.

It is further evident that, as in Example 5, the thermal treatment must not be carried out at a temperature that exceeds substantially that of the melting point of the polyethylene, at the risk of materially altering the stress properties.

Thus according to Examples 5 and 6 of the description an improvement in the characteristics is obtained by reheating the product to a temperature between about 120° and about 146° for the mixture containing polyethylene during one hour. In general the reheating temperature is held between −20° and +10° with respect to the melting point of the polyethylene. When the reheating temperature is near the lower limit, the time of reheating most likely must be increased to about 2 hours. When this temperature is near the upper limit the reheating time can be decreased to about 10 minutes. It will be recognized that the optimum temperatures and the times are determined according to the qualities and proportions of the ingredients of the mixture.

It will be appreciated that during the reheating the mixture must be prevented from contracting by any suitable mechanical means. In Examples 5 and 6 the confinement of the samples of the mixture under pressure in an ordinary vulcanization mold, i.e., the piston mold, is sufficient to prevent the contraction. In the case of a band or sheet which is thin it suffices to immobilize the extremities thereof to prevent the contraction during the reheating.

EXAMPLE 7

Prepared are two batches of the following mixture:

| Example 7 Prepared are two batches of the following mixture: | Parts by weight |
| --- | --- |
| Nitrile butadiene (BT 205) | 100 |
| polyethylene (GUR Hostalen) | 30 |
| phenyl-beta-naphthylamine | 1 |
| zinc oxide | 3.5 |
| stearic acid | 2 |

Each batch of the mixture is processed in the hot on a mill for 5 minutes at 152° C. To the first batch there are added 4 parts of sulfur before the end of the operation. To the second batch there is added at the beginning 1 part of zinc diethyldithiocarbamate. After cooling under tension to prevent contraction of the sheets issuing from the mixer, sandwich-type sheets alternating from one to the other batch are vulcanized for 45 minutes at 120° C.

| Properties of the products | Longitudinal Direction | Transverse Direction |
| --- | --- | --- |
| Modulus of elasticity at 100% elongation (kg/cm$^2$) | | 31.5 |
| Modulus of elasticity at 1% elongation (kg/cm$^2$) | 40 | |
| Breaking elongation | 15% | 355% |
| Resistance to breaking (kg/cm$^2$) | 490 | 56 |

The examples given hereinabove as embodiments of the present invention show that by virtue thereof it is possible to obtain flexible and homogeneous rubber products having very high resistances to elongation by replacing either partially or completely the customary carbon black with polyolefins having a very high molecular weight and being reduced to small particles which are fibrillated in situ in the product. This fibrillation brought about by a mixing or blending operation at a temperature close to or higher than the melting temperature of the polyolefin, preserved at least in part in the finished product, is the reason for the very high resistances having been obtained.

EXAMPLE 8

Figure 2:

In this example the nature of the products of this invention is further described with reference to the accompanying drawings wherein:

FIGS. 1 and 2 are microphotographs of a product produced in accordance with the process of this invention. These photographs show the fibers or fibrils of polyethylene (the light colored zones or areas) within the matrix of rubber (the dark colored zones). These photographs were obtained by an electron microscope with a sweep and they represent the cross-section of a mixture base whose composition corresponds to that described and processed in Example 1. One may see the extremities of the polyethylene fibers projecting perpendicularly to the cross-sectional face of the product. From these photographs it is apparent that a significant quantity of the polyethylene powder has been placed in the form of elongated fibers substantially parallel one to another.

From such microphotography the proportions and the dimensions of the fibers or fibrils of the polyolefin heretofore described are determined.

Moreover, the orientation of the polyolefin fibrils which is put in evidence by the differences between the moduli measured in the longitudinal direction and those measured in the transverse direction allows for obtaining ultimately products that have remarkable properties and are comparable in certain cases to those of the rubber products being reinforced with fabrics or with roped, corded, or twisted textiles.

These products may be present particularly in the form of thin laminated foils or extruded bands having, in the longitudinal direction of orientation of the fibrils, a resistance to elongation in the order of from 10 to 100 times greater than the resistance to elongation in the transverse direction. These products thus may be used for making diversified articles. When they are present in the form of sheets or foils, these products may also be assembled beforehand or laminated to each other in such a manner as to obtain composite products with a stratified structure in which the high resistance to elongation of the elements constituting the same is used along several directions. Thus it is possible, for example, to superimpose and assemble two or several sheets or layers each having marked properties of anisotropy due to the orientation of the fibrils, but taking care in the course of this assembling that the direction of orientation of the fibrils be crossed in at least two sheets of the assembled unit. In this manner one may obtain a composite sheet having a high resistance along at least two directions that are crossed perpendicularly, or along other angles. The assembled unit and the union of these elementary sheets layers may notably be obtained at the time of the vulcanization of the product in superimposed layers.

The products according to the present invention are susceptible to multiple applications in many of the fields of rubber articles.

It will be appreciated that in order to obtain the desired properties the polyolefin employed must be highly crystalline. For example, the polyethylene used generally has a crystallinity of about 70%.

It will also be understood that the foregoing examples are merely illustrative of the effective conditions and sequence of steps for obtaining the unique polyolefin reinforced rubber. For example, experiments have been made wherein the incorporation of vulcanization agents into the kneaded rubber-polyolefin mixture is effected by immersing a sheet of the crude mixture in a 3% solution of tetramethyl-thieurame in tetrasulfur acetone. Thereafter the sheet is left for several minutes in the solution and subsequently dried and vulcanized. The vulcanization procedures exemplified in the foregoing examples are however of greater interest from an industrial standpoint.

While the novel principles of the invention have been described, it will be understood that various omissions and modifications in these principles may be made by one skilled in the art without departing from the spirit and scope of the invention.

What is claimed is:
1. A flexible, homogeneous rubbery product comprising a matrix of a rubber selected from the group consisting of a natural elastomer and a synthetic elastomer in which there is uniformly dispersed at least 5% by weight based on the weight of the elastomer of a crystalline polyolefin whose molecular weight is equal to or greater than 500,000, characterized in that the polyolefin is in the condiition of fine particles which are drawn out in the form of a plurality of elongated fibrils having a diameter smaller than 5 microns and a length on the order of from about 2 to 20 millimeters, said polyolefin fibrils being uniformly dispersed within the elastomer matrix with a dominant directional orientation thereby imparting to the product a very high resistance to elongation in accordance with the direction of orientation of the fibrils.

2. A rubbery product according to claim 1, in which the polyolefin fibrils have a diameter on the order of about one micron.

3. A rubbery product according to claim 1, further comprising up to about 100% by weight of carbon black.

4. A rubbery product according to claim 1, in which the polyolefin is polyethylene.

5. A rubbery product according to claim 1, in which the matrix consists of a vulcanized elastomer.

6. A rubbery product according to claim 1, in which the matrix consists of a non-vulcanized thermoplastic sequential copolymer of butadiene and styrene.

7. A rubbery product according to claim 1, characterized in that the product is in the form of a sheet having in the longitudinal direction of the orientation of the fibrils a resistance to elongation in the order of from 10 to 100 times greater than the resistance to elongation in the transverse direction.

8. A rubbery product according to claim 1, in which said polyolefin is polypropylene.

9. A rubbery product according to claim 1, in which said rubber is selected from the group consisting of cis-1,4-polyisoprene, cis-polybutadiene, copolymers of styrene and butadiene, copolymers of butadiene and acrylonitrile, copolymers of polyisobutylene and isoprene, copolymers of ethylene and propylene and polychloroprenes, and said polyolefin is a polymer of monoethylicically unsaturated hydrocarbons having 2 to 6 carbon atoms.

10. A process for producing a rubbery product consisting essentially of a matrix of a rubber selected from the group consisting of a natural elastomer and a synthetic elastomer and at least 5% by weight based on the weight of the elastomer of a crystalline polyolefin uniformly dispersed within said matrix, said polyolefin having a molecular weight of at least 500,000, which comprises blending said rubber and fine particles of said polyolefin together to form a mixture at a temperature from 0° to 50° C. higher than the melting point of the polyolefin to obtain fibrillation in situ of the polyolefin particles, forming the mixture into an elongated product while maintaining the mixture at a temperature from 0° to 50° C. higher than the melting point of the polyolefin and thereafter, maintaining the mixture while in the form of said elongated product, under tension so as to prevent the elongated product from becoming contracted while the mixture is cooled to a temperature lower than the melting point of the polyolefin whereby a substantial portion of the polyolefin remains in th state of elongated fibrils within the final rubbery product, said fibrils having a diameter smaller than 5 microns and a length on the order of from about 2 to 20 millimeters.

11. A process according to claim 10, after the the mixture is cooled while being maintained under tension, the mixture is maintained at a temperature close to the melting point of the polyolefin while preventing the mixture from becoming contracted so as to increase the toughness of the fibrils.

12. A process according to claim 10, in which a vulcanization system is incorporated in the mixture prior to the formation of said elongated product by immersion of said mixture in a solution containing vulcanizing agents.

13. A process according to claim 12, in which a vulcanization system is added to the mixture toward the end of the mixing or blending operation.

14. A process according to claim 10, wherein said polyolefin is polyethylene and said temperature is from 10 to 25° higher than the melting point of polyethylene.

15. A process according to claim 10, wherein said polyolefin is polypropylene.

16. A process according to claim 10, wherein the mixture, in the form of said elongated product, is cooled to a temperature of at least 20° C. lower than the melting point of the polyolefin.

17. A process according to claim 10, wherein the rubber-polyolefin mixture is blended in a mixing means to effect fibrillation of the polyolefin particles and the mixture is then caused to pass into a shaping apparatus which draws out the mixture while the mixture has said temperature of from 0° to 50° higher than the melting point of the polyolefin so as to effect orientation of the polyolefin fibrils.

* * * * *